United States Patent [19]

Campbell et al.

[11] Patent Number: 4,989,090
[45] Date of Patent: Jan. 29, 1991

[54] TELEVISION SCAN LINE DOUBLER INCLUDING TEMPORAL MEDIAN FILTER

[75] Inventors: Jack J. Campbell, San Francisco; Yves C. Faroudja, Los Altos; Thomas C. Lyon, San Jose, all of Calif.

[73] Assignee: Yves C. Faroudja, Sunnyvale, Calif.

[21] Appl. No.: 334,004

[22] Filed: Apr. 5, 1989

[51] Int. Cl.$^5$ .............................................. H04N 7/01
[52] U.S. Cl. ...................................... 358/140; 358/11
[58] Field of Search .................. 358/140, 11, 105, 12, 358/141, 138, 133

[56] References Cited

U.S. PATENT DOCUMENTS

| | | | |
|---|---|---|---|
| 4,400,719 | 8/1983 | Powers et al. | 358/140 X |
| 4,785,351 | 11/1988 | Ishikawa | 358/140 |
| 4,791,487 | 12/1988 | Kozuki et al. | 358/140 |

Primary Examiner—Victor R. Kostak
Attorney, Agent, or Firm—David B. Harrison

[57] ABSTRACT

A video pixel interpolator generates interpolation pixels from incoming picture image pixels for use within a television picture scan line doubler system. The interpolator includes a temporal median filter for generating an interpolation pixel by selection of the median one of a plurality of temporal pixel samples derived from incoming video, an intra-field averager means for generating an intra-field pixel average, and a switch connected to switch an input to a line doubler of the system between outputs of the temporal median filter and the intra-field averager in response to detection of pixel motion within the picture image. Improved motion detection, and multi-channel processing are also included within the present invention.

30 Claims, 5 Drawing Sheets

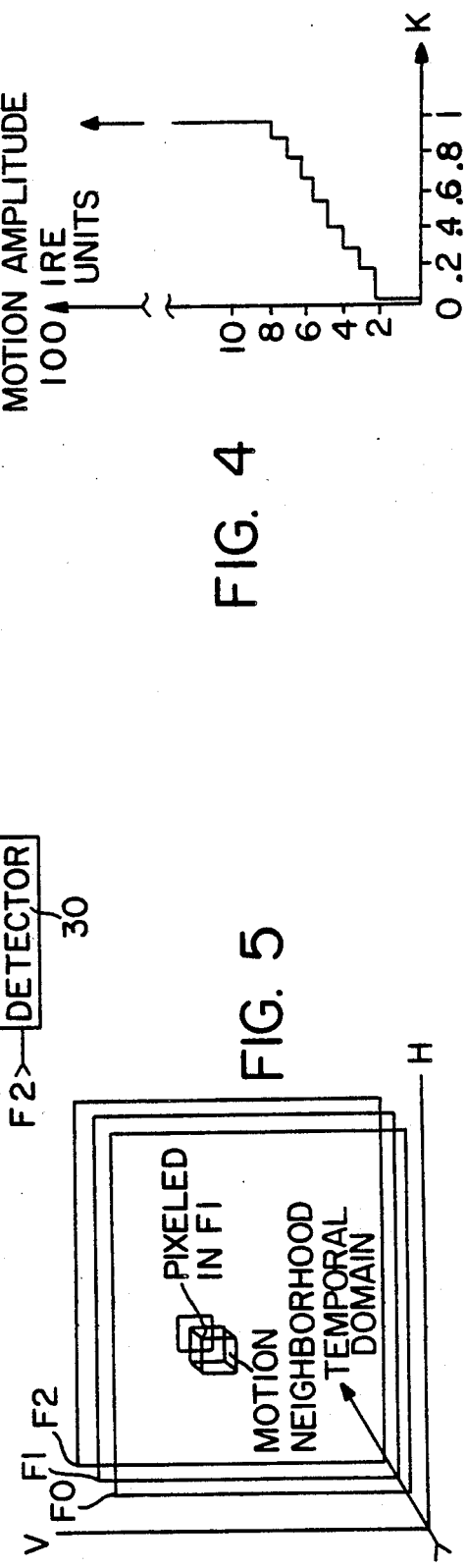
FIG. 4
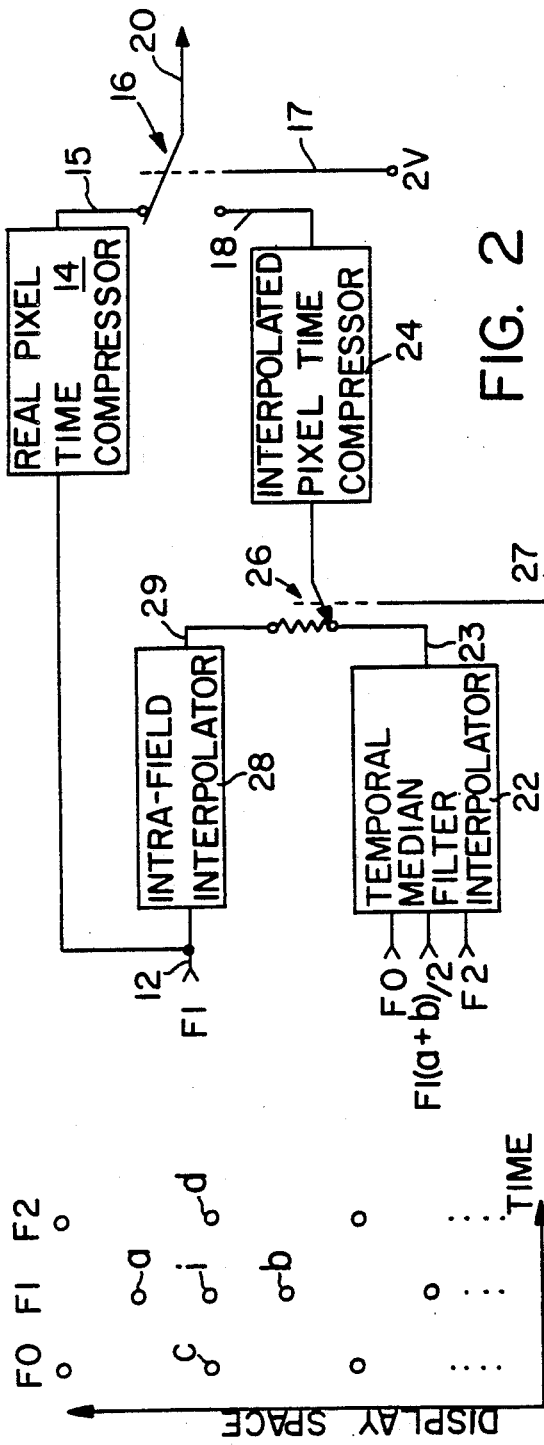
FIG. 2
FIG. 1
FIG. 5

TELEVISION SCAN LINE DOUBLER INCLUDING TEMPORAL MEDIAN FILTER

FIELD OF THE INVENTION

The present invention relates to scan line doublers for increasing the number of apparent scan lines of a display device to reduce the visibility of the scan line structure of the picture image. More particularly, the present invention relates to a television scan line doubler which includes a temporal median filter and motion detector.

BACKGROUND OF THE INVENTION

When all other sources of error and distortion have been removed or minimized by correction or compensation, standard NTSC color video picture images become limited in quality by perceptibility of the line scan structure. Subjective visibility of the line scan structure is a direct consequence of the limited number of horizontal scan lines in the standard composite picture, and is further a direct consequence of field by field interlace. A conventional television frame at a 30 Hz repetition rate is composed of two fields, e.g. F0 and F1. Each field includes 262.5 scan lines, each of which are separated by an unilluminated strip or band. Successive fields are offset so that the scan lines of the next field occupy the unilluminated strips of the present field. This arrangement is followed to minimize perception of 30 Hz flicker in the resultant picture display.

However, with development of high resolution display devices and large screen formats, the visibility of the basic line scan structure has become the most pronounced limitation of the conventional scan format and has led recently to a proliferation of proposals for high definition television or "HDTV". A main drawback of most HDTV formats is that they are not downwardly compatible with existing transmission and reception equipment, equipment which represents an enormous investment.

One approach for reducing the visibility of the line scan structure of the television image calls for estimating or interpolating picture elements for additional scan lines from the picture elements already present in the picture image scanned in the conventional format. This prior approach is known in the art as "time compression" or "scan line doubling", and it calls for doubling the number of scan lines from 262.5 lines per field to 525 lines per field. Thus, 525 scan lines are presented each 60th of a second.

One prior approach to pixel interpolation is carried out by an intra-field or spatial domain process. The pixel for the unilluminated band between two scan lines is derived as the average of the pixel amplitude (and hue) of the pixel in the scan line directly above and of the pixel in the scan line directly below. This approach may be followed with relatively simple circuit implementation. Its main drawback is the reduced resolution or softness of the resultant picture image in the vertical dimension at edges and some perceptible 30 Hz vertical domain flicker in the instance of sharp vertical transitions within the picture image.

Another prior approach to line doubling operates on inter-field basis. In this approach, the pixel to be interpolated for a new scan line in the present field is obtained as the pixel value from the scan line of the prior field at the same spatial location of the picture image. This inter-field approach requires a field period delay and is much more expensive to implement than the intra-field approach. However, when there is no motion in the picture, a very high resolution picture display results. When there is motion, the inter-field approach completely breaks down. In the presence of motion, the objects in motion are accompanied by double image ghosts or aliases, ragged sawtooth patterns on vertical edges in the picture and flickering at the 30 Hz rate along motion transition edges. With an otherwise noise-free picture, a motion value of 2 IRE units, for example, will result in visible double image aliases with this prior approach.

Thus, the inter-field approach to pixel interpolation has not been successfully used in line doublers without some mechanism for motion adaptation. Motion adaptation circuits add further expense to this approach. With a motion adaptation circuit, it has then been possible to construct a line doubler which switches from the higher resolution inter-field approach to the lower resolution intra-field approach whenever motion is detected within the picture image. Such an approach is described and discussed in conjunction with FIG. 13 of Powers U.S. Pat. No. 4,400,719 entitled "Television Display System with Reduced Line-Scan Artifacts".

Since most television picture content derived from reality includes a significant motion content, the prior art inter-field line doublers handled the motion content by switching to intra-field spatial domain interpolation, for example. A significant drawback of the prior art inter-field line doublers is that they have needed to be switched at a very low motion level to the spatial domain interpolation in order to avoid objectionable artifacts in the resultant picture. With such a low a switch threshold being required, the switching has been triggered by noise in the picture and has resulted in a noisier picture with intra-field interpolation.

A temporal median filter has been proposed for use within a television receiver in a paper by C. Hentschel entitled "Linear and Non-Linear Procedures for Flicker Reduction" presented at the 1987 IEEE International Conference on Consumer Electronics and published in the *Digest of Technical Papers* at pages 174 and 175. However, in that approach two new fields were derived by temporal median filter interpolation and inserted in a field-doubled display. There is no teaching or suggestion in the published paper of a temporal median filter for use within an inter-field scan line doubler structure.

Thus, a hitherto unsolved need has arisen for an inter-field line doubler which enables temporal interpolation of pixels at a higher motion threshold than heretofore without generation of objectionable artifacts.

Objects in motion within the video picture must still be detected, so that temporal pixel (field difference) interpolation processes are discontinued in favor of spatial pixel (line difference) interpolation processes. While field-recursive motion detection has been proposed by the Tonge et al. U.S. Pat. No. 4,730,217 in order to bridge spectral gaps occurring in certain conditions of motion within the picture, the recursive approach taken therein provides for recirculation or feedback of the overall motion control signal itself, rather than one component or aspect thereof. The Tonge et al. overall recirculation technique employed field delay recirculation. The Tonge et al. definition of "field" is unclear. If "field" as used by Tonge et al. meant 262 lines, the resultant recirculation would cause a spread or crawl upwardly into the vertical domain. If "field" as used by Tonge et al. meant 263 lines, downward spread or crawl into the vertical domain resulted. In any event, the Tonge et al. approach resulted in an undue vertical spreading of the motion control signal and did not aid or foster development of a motion control signal which is related in amplitude or value to overall magnitude of the motion event being detected. The practical consequence of the Tonge et al. approach was that the pixel interpolator switched to a spatial domain interpolation process too frequently and for too long a time, thereby resulting in a picture of lesser resolution than necessary.

Thus, a further hitherto unsolved need has arisen for an improved motion detector which enables development of a proportional interpolation process switching control signal while still covering spectral gaps occurring from some picture motion conditions.

SUMMARY OF THE INVENTION WITH OBJECTS

A general object of the present invention is to provide an improved method and apparatus for television scan line doubling and display which includes a temporal median filter for pixel interpolation in a manner which overcomes limitations and drawbacks of the prior art.

A more specific object of the present invention is to include a temporal median filter within an inter-field line doubler for a line doubled television display so as to eliminate the double imaging artifact otherwise occurring in prior art inter-field interpolation processes in the presence of motion in the field to field picture content.

Another specific object of the present invention is to provide an improved motion detector for proportional controlling an interpolator for a television scan line doubler which normally interpolates pixels on the basis of median values derived in the temporal domain and which switches to spatial domain pixel interpolation in the presence of detected motion within the video picture.

One more specific object of the present invention is to provide an improved interpolator for a television scan line doubler which switches incrementally from a temporal median filter output to a spatial interpolation value in relation to amplitude of a motion value derived from the motion activity in the vicinity of the pixel to be interpolated.

In accordance with the present invention, a television line doubler doubles the number of scan lines available for display upon a television display device. The line doubler includes a temporal median filter which is connected to receive simultaneously and select and put out the median one as an interpolation pixel F1i in a one field delayed F1 field, the interpolation pixel F1i being selected from a group including an actual pixel value from a present field F0, a pixel average value in the F1 field of F1(a+B)/2 wherein a is the pixel in the scan line above the pixel i location and b is the pixel in the scan line below the pixel i location, and an actual pixel value from a two field delayed field F2. The line doubler further includes a real pixel time compression circuit connected to time compress the pixels of each scan line of the F1 field into half of the original scan time and to put out time compressed scan lines during a first double scan rate line scan interval; and, an interpolated pixel time compression circuit connected to time compress the interpolated pixels i of each scan line put out by the temporal median filter into half of the original scan time and to put out the time compressed scan lines during a second double scan rate line scan interval. Finally, the line doubler includes a switch for switching between the outputs of the real pixel time compression circuit and the interpolated pixel time compression circuit, for putting out line doubled video to the display device.

In one aspect of the present invention, the television line doubler set forth in claim 1 further comprises an intra-field pixel interpolator for putting out as an interpolated pixel the F1(a+b)/2 intra-field average value, and a second switch connected to switch between the output of the temporal median filter and the output of the intra-field pixel interpolator, and a multi-component motion detector including at least one frame-recursive component for detecting a motion value in the vicinity of the pixel i to be interpolated for causing the second switch to switch its output to the interpolated pixel time compression circuit from the temporal median filter to the intra-field interpolator in accordance with the motion value.

In a further aspect of the invention, the multi-component motion detector and the second switch of the television line doubler provide a proportional switch which switches in accordance with absolute amplitude of the motion value.

In yet another aspect of the present invention, the switching characteristic of the proportional switch has an onset at approximately 2 to 5 IRE units of motion value amplitude and reaches full switchover to the intra-field interpolator means at approximately 5 to 15 IRE units of motion value amplitude.

In one more aspect of the present invention, a motion detector determines motion activity in the immediate vicinity of the pixel to be interpolated and stretches this motion to a predetermined number of adjacent pixel locations in the line domain. A recirculation loop enables a component of motion to be recirculated and thereby to cover some spectral gaps occurring under certain motion conditions without spreading in the vertical domain.

These and other objects, aspects, advantages and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1 is a greatly enlarged time slice of a portion of a conventional raster scan of picture elements depicted for three fields as small circles, with a picture element to be interpolated being depicted as a solid dot.

FIG. 2 is an overview block diagram of a television scan line doubler including a temporal median filter in accordance with the present invention.

FIG. 4 is a graph of the switching characteristics of a proportional switch included within the FIG. 2 scan line doubler.

FIG. 5 is a pictorial graph of an area of the television picture image surrounding the pixel to be interpolated which is considered for motion amplitude in deriving the motion signal depicted on the vertical axis of the FIG. 4 graph.

DETAILED DESCRIPTION OF A PREFERRED EMBODIMENT

Figure 3:
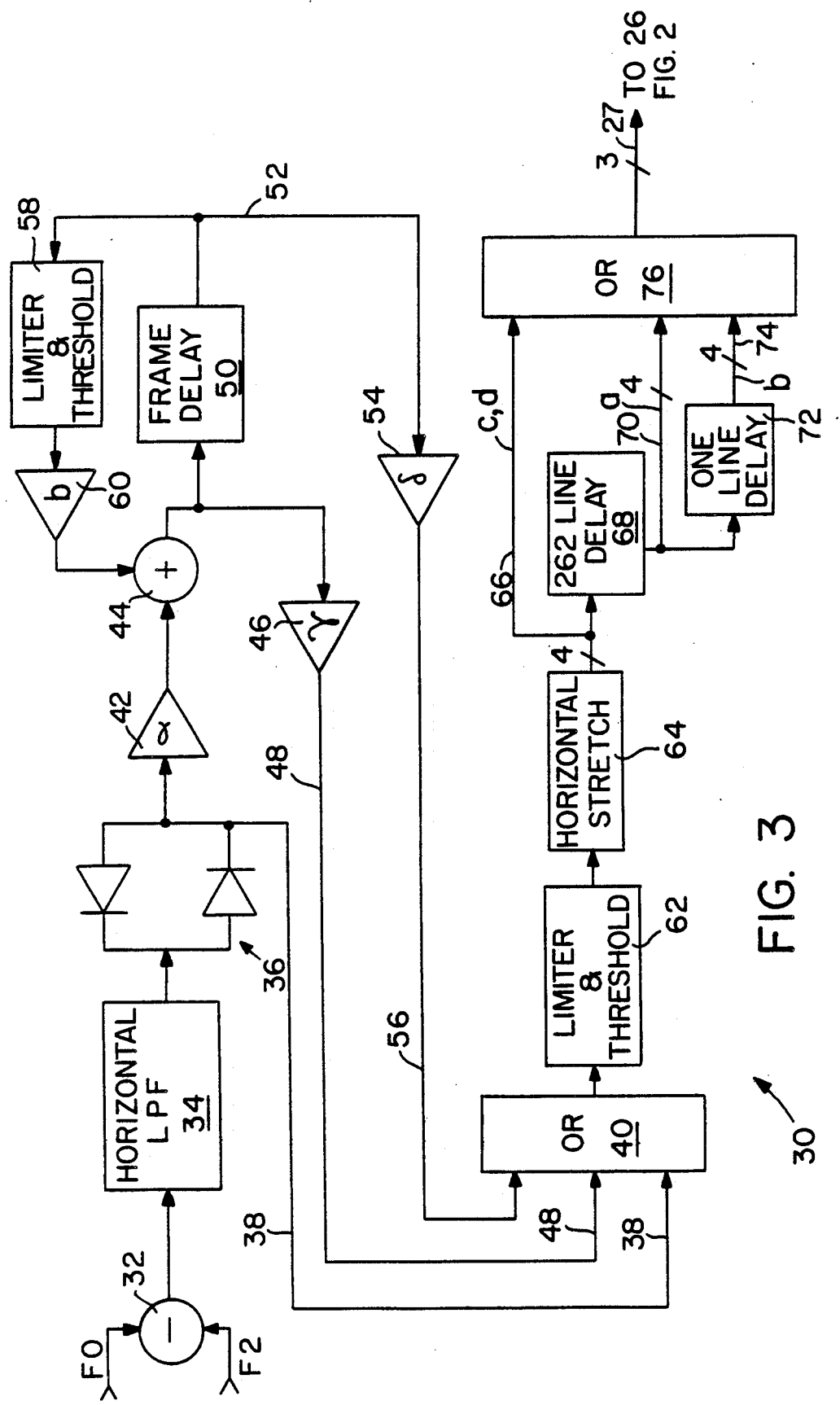
FIG. 3 is a detailed block diagram of a preferred embodiment of a multi-component motion detector for inclusion within the FIG. 2 scan line doubler.

FIG. 1 depicts a diagrammatic view of the edge of a raster scan display spread horizontally along a time plane. In this figure there are three vertical columns of picture elements (pixels), denoting three successive scan fields, the present field F0, a once prior field F1 (reference field), and a twice prior field F2. Each original or real pixel of the conventional scan, i.e. one derived from a camera scan of some visual image, etc., is denoted by a small circle which generally approximates its position in vertical display space and in time along the horizontal axis. One pixel i within the F1 reference field to be derived by interpolation is shown in FIG. 1 by a solid dot at a position equidistant between four real pixels, pixels a and b of F1, pixel c of F0, and pixel d of F2. Pixels a and b of F1 denote adjacent original scan lines within the F1 field. The location of the interpolated pixel i denotes the location of the unilluminated band between the two adjacent scan lines. Pixels c and d illustrate the interlace process by which, for example, pixel d previously illuminated the band in question and pixel c will illuminate the band left dark in the F1 field.

By inspection of FIG. 1, in the absence of motion or change in the picture content, pixel i is best represented by pixel c or d, either one of which aligns exactly with the unoccupied pixel space i to be filled in by interpolation. On the other hand, if there is motion at the vicinity of pixel i, the time delay between fields F2 and F0, one thirtieth of a second in the conventional NTSC scan format, is sufficient to cause a visual artifact at that site at a 30 Hz flicker rate if either the F0 or F2 pixels c or d are used in the interpolation process. In that situation, the practice has been to interpolate pixel i as an average of pixels a and b.

Applicants have discovered that pixel interpolation within many visual motion conditions may be more accurately approximated by use of a temporal median filter than with the methods employed in the prior art. In the FIG. 1 example, the temporal median for the pixel i is the one of pixel F0c, F1(a+b)/2 or F2d pixel having an amplitude lying between the amplitudes of the other two choices. This temporal median filter approach has been found to work very well without any noticeable resultant artifacts in most picture motion conditions. It generally eliminates the double image artifact, and its failure modes occur infrequently and with little overall picture quality degradation. (One infrequently encountered failure mode is the case of moving small objects and impulses wherein the rate of movement results in a spatial displacement which is greater than the size of the object or impulse.) This approach yields a line doubled picture image having higher resolution more often than heretofore obtained.

Thus, by using a temporal median filter in place of other temporal interpolation processes, the major artifacts in motion are eliminated or significantly reduced, and when combined with switching to a spatial domain interpolation with high motion content, a picture with less artifacts is obtained, even in the presence of motion. In this regard, it is practical, for example, to detect motion at the output of the temporal median filter.

With reference to FIG. 2, a system 10 employing principles of the present invention is shown in structural overview. An input 12 receives a one field delayed signal (denoted F1 in FIG. 1). This incoming video signal may be monochrome video or it may be the luminance component of a composite color television signal. It has the characteristics ascribed to it as explained in conjunction with FIG. 1. The F1 signal on the line 12 is passed through a conventional time compression circuit 14, such as a scan line first in/first out (FIFO) buffer memory which is written at the incoming pixel quantization rate (typically four times the color subcarrier frequency or "4X") and which is read out at twice the incoming pixel quantization rate (or "8X"). The circuit 14 typically includes separate write and read pointers and is arranged as a ring memory array. Its output leads to a switch circuit 16 which is switched at twice the horizontal line scan rate (i.e. 15 kHz in the NTSC format). The switch 16 recurrently selects between a scan line of original pixels from the real pixel time compressor 14 and a scan line of interpolated pixels on a line 18. Thus, an output 20 of the line doubler 10 provides two scan lines in the time originally accorded to a single scan line.

A temporal median filter interpolator 22 receives three inputs: an F0 field input; an F1(a+b)/2 present field spatial average input; and an F2 field input. The F2 input represents the field occurring just before the F1 present field, and the F0 input represents the field occurring just after the F1 present field. Thus, the present field F1 spatial average input implies that this input has been delayed by one field from actual incoming video at the conventional scan rate. The temporal median filter interpolator 22 determines and puts out the median one of the three inputs for each pixel to be interpolated. The output from the temporal median filter 22 is passed through an interpolated pixel time compression circuit 24, which operates in the same fashion as described for the real pixel time compressor 14, except that the output on the line 18 is timed to be in synchronism with the switch 16 at the 15 kHz line scan rate.

A minimum system configuration in accordance with the present invention would include elements 14, 16, 22 and 24. This minimum configuration system works very well in most motion conditions and can be further improved by addition of switch 26, a spatial or intra-field interpolator 28 and a motion detector 30 to control the switch 26. The switch 26 is shown in the no-motion or low-motion position and switches to the output of the intra-field interpolator 28 when motion amplitude in the vicinity of the pixel to be interpolated is at or above a switching threshold, such as 3-7 IRE units. One suitable pixel motion neighborhood is shown greatly enlarged in FIG. 5 and discussed hereinafter in connection therewith. Motion occurring within this neighborhood or vicinity of the interpolation pixel i is considered in development of a motion control signal for controlling operation of the switch 26.

While a motion detector may operate in any fashion known in the prior art in order to develop an absolute motion amplitude value in the vicinity of the pixel i to be interpolated, the motion detector 30 depicted and discussed in conjunction with FIG. 3 hereof offers superior motion detection performance and is presently preferred.

As shown in FIG. 2, the switch 26 is depicted as a fader which normally selects the median pixel output on a line 23 and which switches incrementally or proportionally to the spatial average value on a line 25 from the spatial interpolator 28, with switching being in relation to the magnitude of the control signal on the line 27. A smooth and fairly linear switching characteristic is provided on the line 27 for controlling the fader 26, as graphed in FIG. 4.

In practice, the switch 26 may be implemented as two fractional multipliers. One multiplier multiplies the signal on the line 29 by a control value k while the other multiplier multiplies the signal on the line 23 by a function (1-k), wherein the control value k has a fractional value lying between zero and unity. Eight steps for k have been used in practice with very satisfactory results, and these eight incremental levels are graphed in FIG. 4, for example.

In accordance with the present invention, the motion control value k on the line 27 is a function of amplitude of motion activity at the vicinity or neighborhood of the pixel i to be interpolated. While motion amplitude may be obtained in any known way, one satisfactory way is to create a motion signal as the difference of F0 and F2 pixels and then carry out a summation of motion signals so derived at several adjacent pixel positions immediately to the right and to the left of the pixel to be interpolated within the same scan line time domain. This results in selection of the largest component of motion values at the vicinity of the pixel to be interpolated.

FIG. 3 sets forth a block diagram of the presently preferred implementation of the motion detector 30. The presently incoming luminance pixel stream F0 is subtracted from the two-field-delayed luminance pixel stream F2 in a subtractor 32 which generates an output indicative of the difference in magnitude between a present pixel, such as the pixel c of FIG. 1 and a two field delayed, spatially aligned pixel, such as the pixel d of FIG. 1, for example. This difference is then low pass filtered in a horizontal low pass filter 34 having a rolloff at approximately 3 MHz to eliminate any residual high frequency components which may include noise, chroma sideband pollution, etc.

The sign of the pixel difference value is removed by action of a sign eliminator graphed for illustration as a full wave rectifier 36. The output of the sign eliminator 36 is defined to represent motion or change in the picture luminance content at the present pixel location without regard to the direction of the transition as from black level to white level, or from white to black. An output line 38 from the sign eliminator 36 extends to an OR gate 40 which selects and puts out the largest value present on a plurality of inputs.

The line 40 also extends through an amplifier 42 having a preselected, controllable gain factor, alpha, which lies between zero and unity. The output of the amplifier 42 leads to a summing junction 44 whose output extends to an amplifier 46 having a preselected, controllable gain factor, gamma. The output from the amplifier 46 extends over a line 48 to another input of the OR gate 40. The output from the summing junction 44 also extends through a frame delay 50 which delays the summed signal by one video frame period (i.e. 525 scan lines in the NTSC picture format). An output line 52 from the frame delay leads to an amplifier 54 having a predetermined, controllable gain factor, delta. An output line 56 from the amplifier 54 extends to a third input of the OR gate 40.

The output line 52 also extends to a recirculation path including a limiter and threshold circuit 58 and an amplifier 60 having a predetermined, controllable gain factor, beta. The output from the amplifier 60 is fed back to the summing junction 44. The degree of frame recirculation is controlled by controlling the gain beta of the amplifier 60 which is always in a range from zero to unity. The gains gamma and delta of the amplifiers 46 and 54 are controlled in order to provide normalized motion values, given the motion value present on the line 38 as a reference. In this regard, it is important to note that motion is only determined to be present when there is an instant difference between an F0 pixel and a corresponding F2 pixel. If, for example, a string of pixel difference values (motion values) occur, the recirculation path provided by the limiter/threshold 58, amplifier 60 and summing junction 44, will fill in any holes that might otherwise occur, given motion velocities and object dimensions within the picture. By using a frame delay 50, the motion differences are spread out along the temporal domain without any spread in the vertical domain, as would occur if a field delay were employed for the delay 50, as has been suggested by the Tonge et al. reference cited above.

The output from the OR gate 40 passes through a limiter and threshold circuit 62 which implements a minimum motion signal amplitude threshold, such as 3 IRE units, below which there will be no switching. The actual threshold may be set to have an onset within the preferred range of 2 to 10 IRE units and to reach full switchover within the preferred range of 5 to 15 IRE units, as graphed in FIG. 4. The limiting action of the circuit 62 limits switching action to a maximum of unity irrespective of actual amplitude of the motion signal above e.g. 15 IRE units.

A horizontal stretching circuit 64, which may be implemented with a recirculating pipeline delay clocked at the pixel rate and an OR gate, causes the motion signal to be stretched in the horizontal domain over a plurality, such as six, adjacent pixels, thereby to provide a horizontal domain neighborhood for the motion signal. While one line of vertical stretching is required, further stretching into the vertical domain, as suggested by the FIG. 5 graph, may be optionally included to extend the motion neighborhood vertically above and below the a and b pixels of the reference field F1, also by inclusion of suitable line delays and recirculation. Any benefit resulting from vertical stretching must be balanced by the cost of implementation of the vertical stretching circuitry.

An output line 66 from the horizontal stretch circuit 64 leads directly to one input of an OR array 76; it also leads to a 262 line delay 68 having an output 70 leading to another input of the OR array 76. The output 70 also leads through a one line delay 72 whose output 74 goes to a third input of the OR array 76. The OR array 76 selects the input having the highest motion amplitude value and puts it out as the three bit motion control value on the line 27 to control operation of the switch 26.

The output line 66 from the horizontal stretch circuit 64 carries the F0 pixel c and the F2 pixel d. By providing the 262 line delay 68, the F1 pixel a is obtained, and by providing the one line delay 72, the F1 pixel b is obtained. Thus, all of the pixel positions directly surrounding the pixel i to be interpolated are considered for motion by the motion detector 30.

The motion control signal k operates the switch 26 in accordance with the graph shown in FIG. 4. This graph shows that operation of the switch 26 begins at about 3 IRE units of sensed motion magnitude at the vicinity of the pixel to be interpolated and incrementally progresses to full switching action by about 7 IRE units of amplitude of detected motion. The 3 IRE unit starting point is selected to be above any noise level in the picture signal that would otherwise be understood as motion. A level in a range between 2 and 10 IRE units should be satisfactory, depending upon the characteristics and method of derivation of the motion control signal. Similarly, a full switching action point of 5 to 15 IRE units should be satisfactory. It has been found that the system 10 works best if full switching occurs at a relatively fast rate and with a smooth incremental action. Eight switch steps have been found to be satisfactory, and the line 27 may be a three bit bus.

A motion neighborhood of pixels surrounding the pixel i to be interpolated at any instant is considered for motion level. Motion activity within this neighborhood, which is dimensionally exaggerated in the FIG. 5 graph, is low pass filtered to remove noise. The resultant motion value, which represents absolute amplitude of summed motion activity within the neighborhood irrespective of direction, is displayed along the vertical axis of the FIG. 4 graph, and results in the quantized three bit (eight level) switch control value on the line 27 to control the fader 26. While eight switch steps are presently preferred, the switching characteristic of the fader 26 may follow a wide variety of patterns or steps. Preferably, the characteristic should be substantially linear and should be very fast. In the picture content, the motion neighborhood only occurs for edges in motion or transition. The body of the object in motion will not be treated as being in motion unless edge details are present within the definition of the body. Also, most low level details are adequately handled by the temporal median filter 22 without switching to the spatial pixel interpolator 28. Thus, a higher resolution, line doubled picture image is obtained with the system 10 than heretofore.

Figures 6A, 6B:
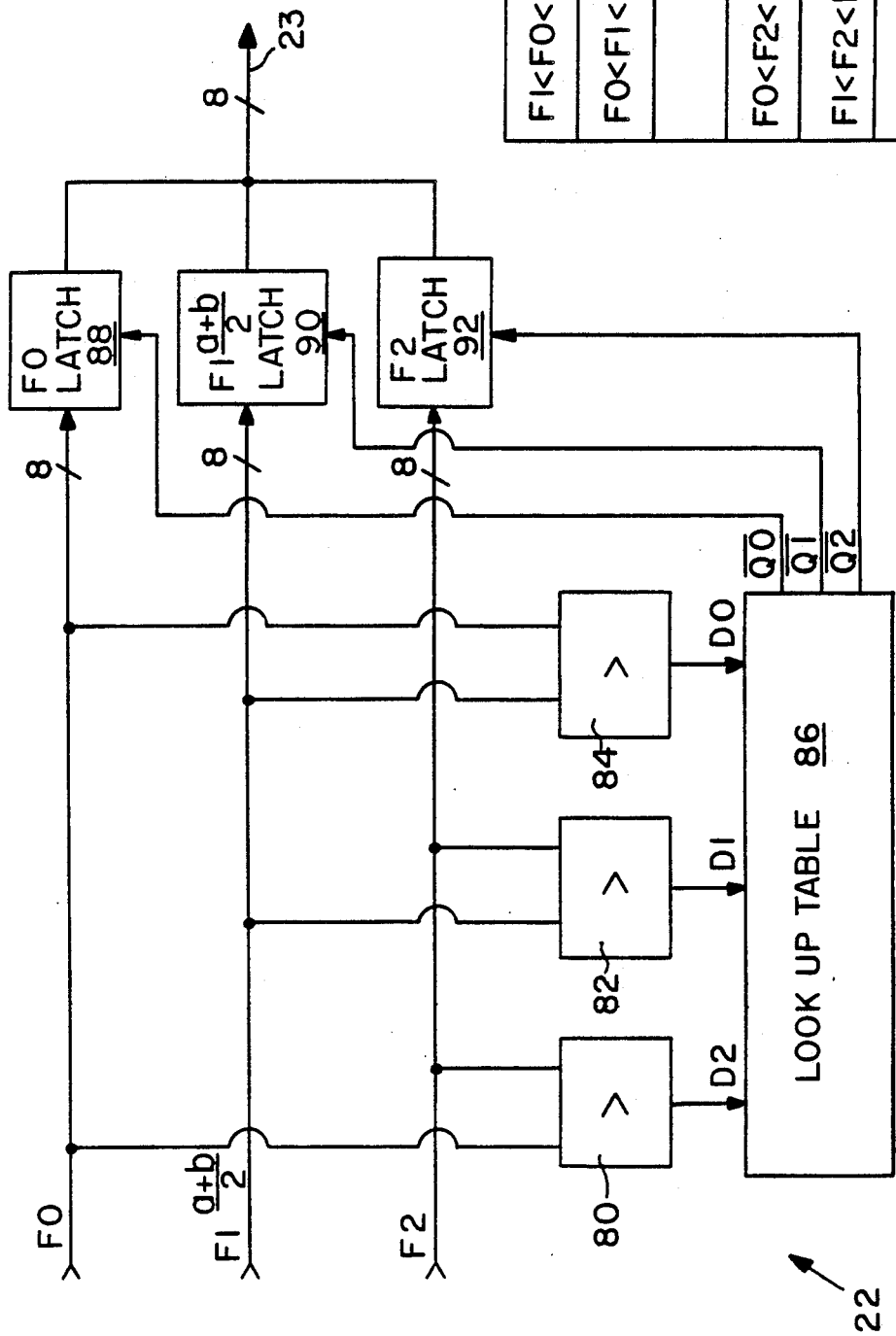
FIG. 6A is a block diagram of a temporal median filter included within the FIG. 2 scan line doubler.
FIG. 6B is a state table illustrative of median value selection operation of the FIG. 6A temporal median filter.

With reference to FIG. 6A, further structural details of one preferred embodiment of the temporal median filter 22 are set forth. As shown in FIG. 2, the temporal median filter 22 receives F0, F1 (a+b)/2 and F2 pixel values as already explained in conjunction with FIG. 1. A comparator 80 compares F0 and F2 and puts out a value D2. The value D2 is one if F0 is greater than F2 and is zero if F0 is less than or equal to F2. A comparator 82 compares F1 (a+b)/2 ("F1") and F2 and puts out a value D1. The value D1 is one if F1 is greater than F2 and is zero if F1 is less than or equal to F2. A comparator 84 compares F1 and F0 and puts out a value D0. The value D0 is one if F1 is greater than F0 and is zero if F1 is less than or equal to F0. The D2, D1 and D0 outputs of the comparators 80, 82 and 84 address a lookup table 86 implemented within a programmable read only memory array, for example. The table 86 puts out three data values BAR Q2, BAR Q1 and BAR Q0. The BAR Q0 (logical low or zero level control active) signal enables an F0 latch 88 and places the F0 value on the output bus 23. The BAR Q1 signal enables an F1 latch 90 and places the F1 value on the output bus 23. The BAR Q2 signal enables an F2 latch 92 and places the F2 value on the output bus 23. Only one of the latches 88, 90 and 92 may be active for any one pixel to be interpolated.

FIG. 6B sets forth a state table which correlates the input values D2, D1 and D0 with the output values Q2, Q1 and Q0 put out by the state table memory 86. The amplitudes of F0, F1 and F2 are also indicated for each output condition. A zero value for one of the output values Q2, Q1 or Q0 indicates that that particular value is selected. Only outputs having one zero are legal, thereby assuring that only one of the latches 88, 90 and 92 will be active at any one time.

Care must be taken in assembling the FIG. 2 system to be sure that proper time delays are inserted in the lines 23 and 29 before the switch 26 and that the motion control signal k on the line 27 is wider than and generally centered in time about the pixel i to be interpolated.

Field and line delays to achieve the F1 (a+b)/2 and F2 functions may be implemented with readily available digital memory devices, and trim delays needed for compensating for process delays may also be implemented with digital memories and programmable address counters. Addressing of the memories may be carried out by counters programmed as modulo-n counters where n represents the total delay period desired.

Figure 7:
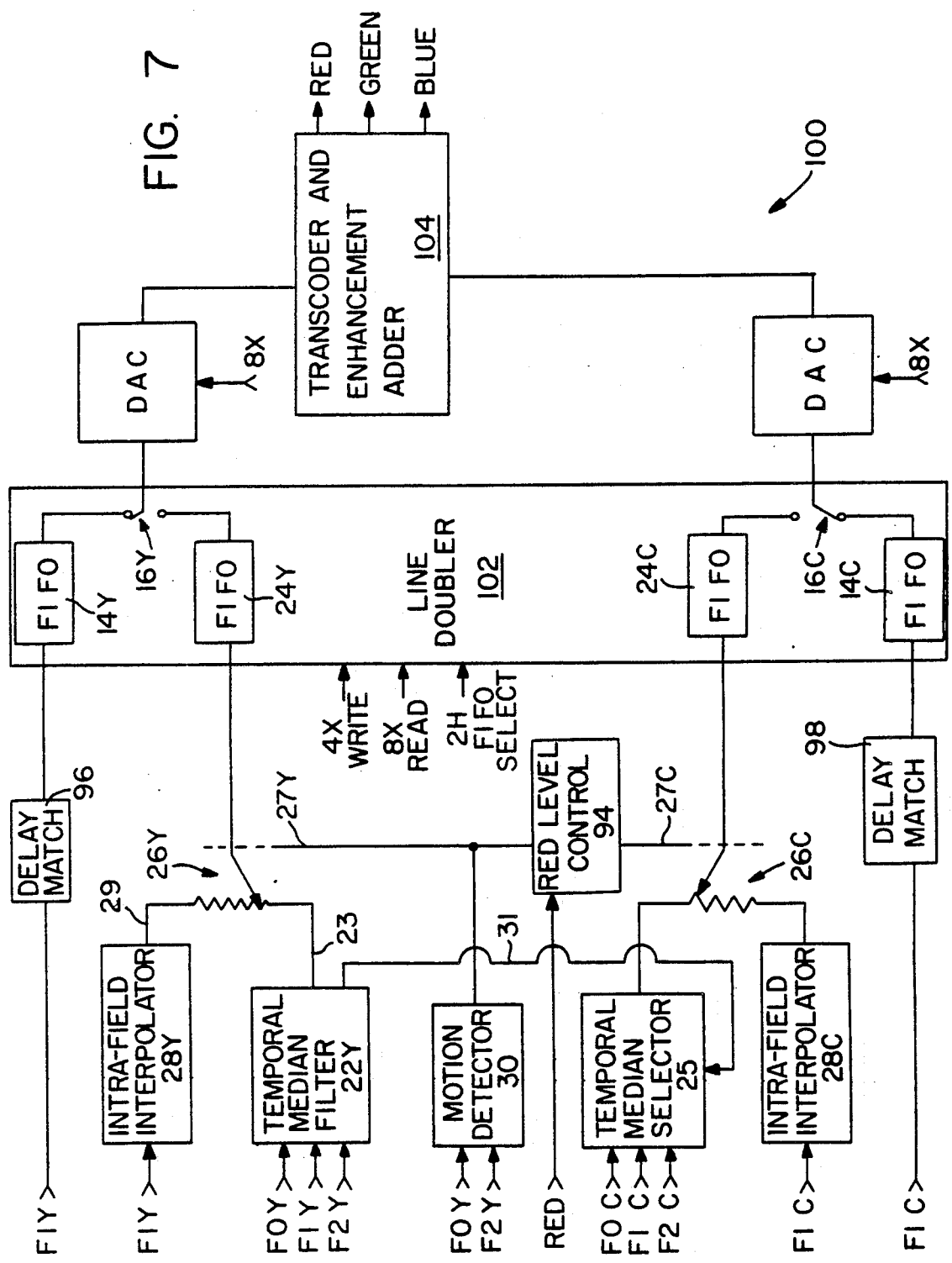
FIG. 7 is a more detailed block diagram of a digital color scan line doubler including temporal median filtering within luminance and chrominance paths wherein the filtering in both paths is under the general control of a single motion detector operating upon luminance values and wherein chrominance control is overriden by a color level detector circuit responsive to some picture conditions. Post line doubling processes including enhancement and transcoding are also shown.
Figure 8:
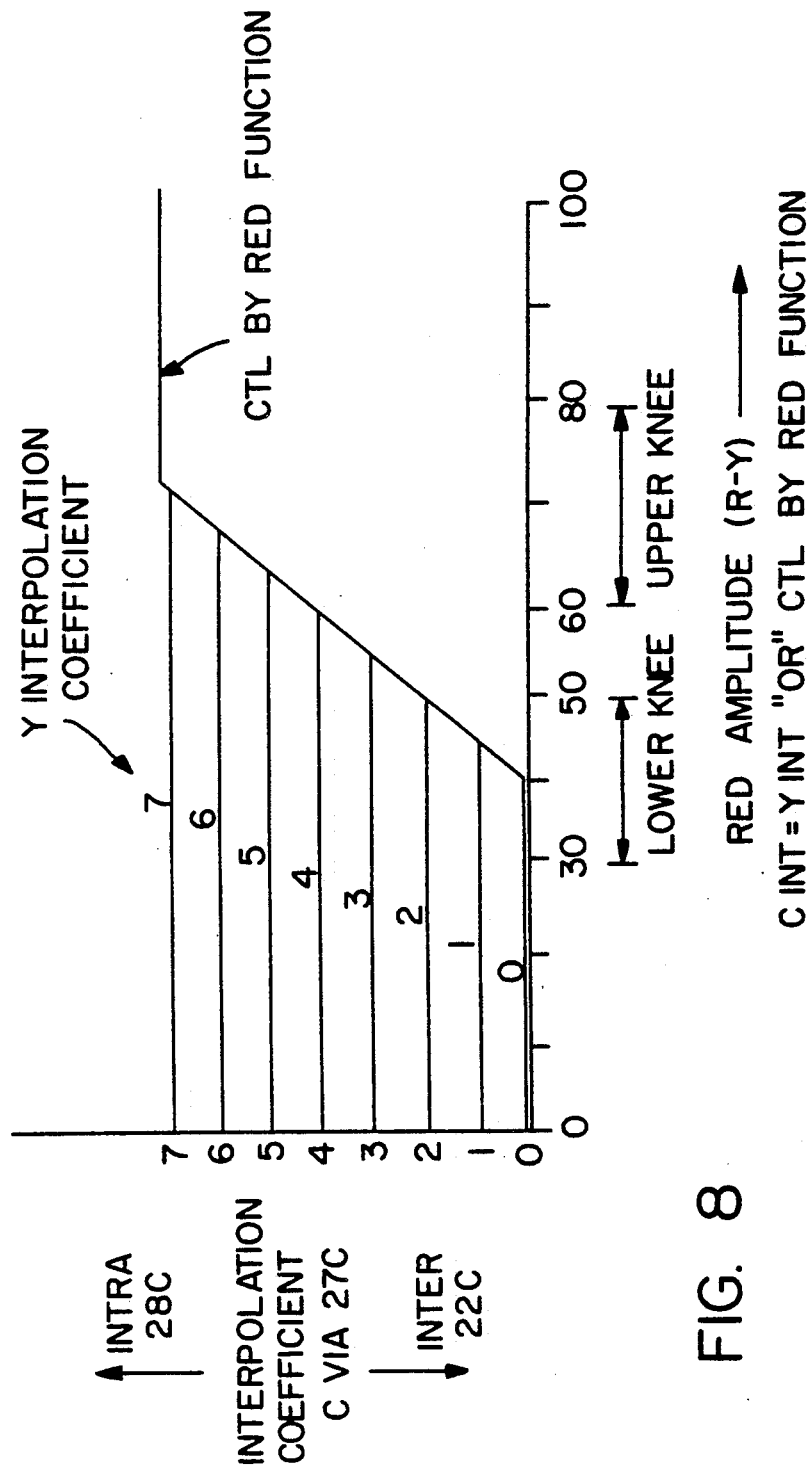
FIG. 8 is a graph of the characteristics of the color level detector circuit included within the FIG. 7 line doubler system.

A line doubler system 100 for composite color picture images may preferably be implemented in accordance with FIG. 7 by duplicating the FIG. 2 structure for time multiplexed, preferably equally weighted chrominance values (i.e. R-Y and B-Y). The luminance components corresponding to those found in FIG. 2 include a "Y" suffix with each reference numeral, while the chrominance components found in FIG. 2 include a "C" suffix. The motion detector circuit 30 operating upon luminance pixel information within a luminance interpolator implemented in accordance with the FIG. 2 system 10 may be used to control interpolation of a parallel chrominance interpolator which is also implemented in accordance with the FIG. 2 architecture. Also, the median determining elements 80, 82, 84 and 86 of the luminance median temporal filter 22Y (FIG. 7) may be used to control selection of the chrominance median pixel value at a chrominance temporal median selector 25 via selection values sent via a control bus 31 from the luminance median temporal filter 22Y to the chroma median selector 25. With this arrangement, the same FIG. 8 comparisons are used to select and put out both the luminance and chrominance interpolation pixels based on derivation of the median of the incoming luminance values, F0, F1 and F2.

Some further improvement in chrominance pixel interpolation may be obtained if a red hue level detector 94 is also included in series with the motion control 30 leading to the chroma fader 26C. The red level detector 94 switches the chroma interpolator from the temporal median filter 22C to the spatial interpolator 28C whenever a predetermined hue, such as red level, reaches a predetermined level, such as 30 to 50 IRE units. The switching control characteristic imposed by the detector 94 is graphed in the graph of FIG. 8. As seen therein, the onset "knee" for chroma control override lies in a range extending from e.g. 30 to 50 IRE units. The full-on switch knee extends in a range from 60 to 80

IRE units. The slope between onset and full-on is desirably smooth, i.e. linear.

By including the red hue level detector a situation where there is color motion with no corresponding change in luminance amplitudes, as when an orange soccer ball is seen travelling across a bright green playing field, for example, causes switching to the spatial domain interpolation process within the chrominance path with no corresponding resolution degradation within the luminance path.

Since resolution is not as critical an issue with chroma information, a color line doubler system including only a spatial domain pixel interpolator for chrominance, such as the interpolator 28 of FIG. 2, will also work very satisfactorily and may be realized at less complexity and cost than a color system which duplicates the FIG. 2 architecture for the chroma pixel interpolation path.

Delay matches 96 and 98 provide suitable delay matching for the real F1 luminance and chrominance pixels so as to match the delays incident to the interpolation processes. The first in-first out line stores 14Y and C and 24 Y and C are simultaneously written with delay matched real and interpolated pixels at the 4X original quantization rate whereas they are read out at the line doubled 8X rate, first one and then the other. The switches 16Y and C are operated by the 2H signal to select the output from one of the FIFOS 14 and 24 during the first half of an original line scan interval and then to select the output from the other of the FIFOs 14 and 24 during the remaining half of the original line scan interval.

In the digital color line doubler implementation 100 such as shown in FIG. 7 wherein luminance and chrominance pixel values are converted to and processed for interpolation and line doubling as digital values such as 8 bit bytes, a very stable clock is required for satisfactory operation of the system 10, since any phase jitter of the clock will be incorrectly construed as motion, with adverse consequences. Phase lock techniques are appropriately employed in the system clock which generates 2X, 4X and 8X, and 2H driving signals, wherein X may be related to the color subcarrier frequency or to the horizontal line scan frequency, and H is the original line scan rate. Time multiplexing of chroma bytes, e.g. red minus luminance (R-Y) and blue minus luminance (B-Y) at a 2X quantization rate enables a single interpolator to handle all of the chroma information.

The FIG. 7 color line doubler 100 may include vertical detail enhancement within the digital line doubler element 102 and it may further include other known enhancement processes within an analog transcoder and enhancement adder 104. A digital to analog converter 106 converts the time compressed luminance pixels into an analog data stream, and a digital to analog converter 108 converts the chroma pixel bytes into another analog stream.

From the foregoing, it is readily apparent that a single, dual or triple channel system may be constructed and used. For example, processing may be of luminance alone, or red minus luminance and blue minus luminance (R-Y and B-Y) or a multi-channel system in which red, green and blue are separately processed.

While the method and apparatus of the present invention have been summarized and explained by an illustrative application in television line doubling including a temporal median filter interpolator, it will be readily apparent to those skilled in the art that many widely varying embodiments and applications are within the teaching and scope of the present invention, and that the examples presented herein are by way of illustration only and should not be construed as limiting the scope of this invention.

We claim:

1. A television line doubler for doubling the number of scan lines available for display upon a display device, the line doubler comprising:
    temporal median filter means for receiving, selecting and outputting the median pixel as an interpolation pixel i in a one field delayed field F1, from a group of input pixels including:
    an actual pixel value c from a present field F0,
    a pixel average value in the field F1 of F1(a+b)/2 wherein a is the pixel n the scan line above the pixel i location and b is the pixel in the scan line below the pixel i location, and
    an actual pixel value d from a two field delayed field F2,
    real pixel time compression means connected to time compress the pixels of each scan line of the F1 into half of the original scan time and to put out time compressed scan lines during a first double scan rate line scan interval,
    interpolated pixel time compression means connected to time compress the interpolated pixel i of each scan line put out by the temporal median filter means into half of the original scan time and to put out the time compressed scan lines during a second double scan rate line scan interval, and
    switch means for switching between the outputs of the real pixel time compression means and the interpolated pixel time compression means for putting out line doubled video to the display device.

2. The television line doubler set forth in claim 1 further comprising intra-field pixel interpolator means for putting out as an interpolated pixel the F1(a+b)/2 intra-field average value, second switch means connected to switch between the output of the temporal median filter means and the output of the intra-field pixel interpolator means, and motion detection means for detecting a motion value in the vicinity of the pixel i to be interpolated for causing the second switch to switch its output to the interpolated pixel time compression means from the temporal median filter means to the intra-field interpolator means in accordance with the motion value.

3. The television line doubler set forth in claim 2 wherein the second switch means is a proportional switch which switches in accordance with absolute amplitude of the motion value.

4. The television line doubler set forth in claim 3 wherein the switching characteristic of the proportional switch has an onset at approximately 2 to 5 IRE units of motion value amplitude and reaches full switchover to the intra-field interpolator means at approximately 5 to 15 IRE units of motion value amplitude.

5. A television line doubler for doubling the number of scan lines available for display upon a display device, the line doubler comprising:
    an input for receiving pixel values from a present field F0,
    a first field delay means connected to the input and having an output F1a,
    a first line delay means connected to the output of the first field delay means and having an output F1b, a second field delay means connected to the output of the first line delay means and having an output F2, an averager means connected to average the output of the first field delay line means and the first line delay means to provide an output F1(a+b)/2, temporal median selector means connected to select and put out as an interpolated pixel value F1i the median one of the values F0, F1(a+b)/2 and F2, temporal median control means connected to receive the F0, F1(a+b)/2 and F2 values for generating a median selection signal and for applying the signal to control median selection by the temporal median selector means, real pixel time compression means connected to time compress scan lines of pixels within the F1 field and to put out the scan lines of time compressed F1 real pixels during a first double scan rate line scan interval, interpolated pixel time compression means connected to time compress scan lines of pixels i put out by the temporal median selector and to put out the scan lines of time compressed Fi interpolated pixels during a second double scan rate line scan interval, first switch means for switching between the outputs of the real pixel time compression means and the interpolated pixel time compression means at a doubled scan line switching rate to provide scan line doubled video to the display device.

6. The television scan line doubler set forth in claim 5 further comprising second switch means connected to switch the input of the interpolated pixel time compression means from the output of the temporal median selector means and the F1(a+b)/2 value in the presence of motion at the vicinity of the pixel F1i being interpolated and wherein a motion control means determines and puts out to the second switch a switch control based upon detected presence of motion.

7. The television scan line doubler set forth in claim 6 wherein the second switch means comprises a proportional switch and wherein the motion control means generates the switch control as a value related to absolute amplitude of motion at the spatial and temporal vicinity of the pixel F1i.

8. The television scan line doubler set forth in claim 7 wherein the switching characteristic of the proportional switch has an onset at approximately 2 to 5 IRE units of absolute motion amplitude and reaches full switchover at approximately 5 to 15 IRE units of absolute motion amplitude.

9. A pixel interpolator for generating interpolation pixels from incoming video pixels for use within a television picture scan line doubler system, the interpolator comprising:

temporal median filter means for generating an interpolation pixel by selection of the median one of a plurality of temporal pixel samples derived from the incoming video pixels, intra-field averager means for generating an intra-field pixel average, and switch means connected to switch an input to a line doubler of the system between outputs of the temporal median filter means and the intra-field averager means in response to detection of pixel motion within the picture image.

10. The pixel interpolator set forth in claim 9 wherein the intra-field averager means is connected to provide an intra-field pixel average as one input to the temporal median filter means.

11. The pixel interpolator set forth in claim 9 wherein the switch means comprises a proportional switch means for switching proportionally from the temporal median filter means to the intra-field averager means in response to the level of a motion control signal representative of the amplitude level of motion activity as a function of brightness level in the proximate vicinity of the pixel presently being interpolated within the picture image.

12. The pixel interpolator set forth in claim 11 wherein the motion control signal has an onset at approximately 3-10 IRE units and causes complete switchover from the temporal median filter means to the intra-field averager means at approximately 7-15 IRE units of motion amplitude.

13. The pixel interpolator set forth in claim 11 wherein the proportional switch means establishes a brightness level in the proximate vicinity of the pixel presently being interpolated by reference to the horizontal, vertical and temporal domain adjacent to said pixel.

14. The pixel interpolator set forth in claim 9 wherein the incoming video pixels comprise separated luminance pixels and separated chroma pixels and said temporal median filter means, said intra-field averager means and said switch means comprise a luminance processor for interpolating said luminance pixels within said system; and, further comprising a chroma processor including chroma temporal median filter means for generating an interpolation pixel by selection of the median one of a plurality of temporal chroma pixel samples derived from incoming chroma, a chroma intra-field averager means for generating an intra-field chroma pixel average from incoming chroma, and chroma switch means connected to switch a chroma input to the line doubler of the system between outputs of the chroma temporal median filter means and the chroma intra-field averager means in response to detection by the luminance switch means of pixel motion within the picture image.

15. The pixel interpolator set forth in claim 11 further comprising chroma level detector means for detecting the chroma level at the vicinity of the luminance pixel to be interpolated and for overriding control by the luminance switch means whenever the detected chroma level at the said vicinity of the pixel to be interpolated exceeds a predetermined threshold amplitude.

16. The pixel interpolator set forth in claim 15 wherein the incoming picture image pixels comprise separated luminance pixels and separated chroma pixels and said temporal median filter means, said intra-field averager means and said switch means comprise a luminance processor for interpolating said luminance pixels within said system; and, further comprising a chroma processor including chroma temporal median filter means for generating an interpolation pixel by selection of the median one of a plurality of temporal chroma pixel samples derived from incoming chroma, a chroma intra-field averager means for generating an intra-field chroma pixel average from incoming chroma, and chroma switch means connected to switch a chroma input to the line doubler of the system between outputs of the chroma temporal median filter means and the chroma intra-field averager means in response to detection by the luminance switch means of pixel motion within the picture image and wherein the chroma level detector means measures red level amplitude and begins to override control of the chroma switch means by the luminance switch means whenever red level reaches a predetermined level in a range between 30 and 50 IRE units.

17. The pixel interpolator set forth in claim 16 wherein the chroma level detector causes smoothly proportional switching between outputs of the chroma temporal median filter means and the chroma intra-field averager means as a function of chroma level with an onset lying in a range between 30 and 50 IRE units and a full-on lying in a range between 60 and 80 IRE units.

18. The pixel interpolator set forth in claim 9 wherein the switch means generates a temporal median filter selection control signal for controlling selection of the median pixel by the temporal median filter means.

19. The pixel interpolator set forth in claim 9 wherein the incoming picture image pixels comprise separated luminance pixels and separated chroma pixels, said temporal median filter means includes median determination circuit means, and said temporal median filter means, said intra-field averager means and said switch means comprise a luminance processor for interpolating said luminance pixels within said system; and, further comprising a chroma processor including chroma temporal median selector means operating under the control of the median determination circuit means of the luminance processor for generating an interpolation pixel by selection of the median one of a plurality of temporal chroma pixel samples derived from incoming chroma, a chroma intra-field averager means for generating an intra-field chroma pixel average from incoming chroma, and chroma switch means connected to switch a chroma input to the line doubler of the system between outputs of the chroma temporal median filter means and the chroma intra-field averager means in response to detection by the luminance switch means of pixel motion within the picture image.

20. The pixel interpolator set forth in claim 19 further comprising chroma level detector means for detecting chroma level at the vicinity of the luminance pixel to be interpolated and for overriding control by the luminance switch means whenever the detected chroma level at the said vicinity of the pixel to be interpolated exceeds a predetermined threshold amplitude.

21. The pixel interpolator set forth in claim 19 wherein the chroma level detector causes smoothly proportional switching between outputs of the chroma temporal median filter means and the chroma intra-field averager means as a function of chroma level with an onset lying in a range between 30 and 50 IRE units and a full-on lying in a range between 60 and 80 IRE units.

22. In a compatible, high resolution television display system for converting conventional video images into line doubled images for display on a scan-line-doubled display device, the system for receiving at an input a quadrature modulated subcarrier color television picture composite signal from a source and comprising spatial comb filter separator means connected to the input for separating and putting out chrominance and luminance components of the composite signal, the improvement comprising:
temporal median filter interpolator means connected to receive the chrominance and luminance components from the spatial comb filter separator means, the temporal median filter interpolator means for separately interpolating pixels from real pixels of each of the chrominance and luminance components and for supplying real luminance component pixels, interpolated luminance pixels, real chrominance pixels and interpolated chrominance pixels to line doubler means,
said line doubler means including luminance buffer memory means for arranging and putting out said real luminance component pixels as scan lines and said interpolated luminance pixels as scan lines of a line doubled luminance component and for arranging and including chrominance buffer memory means for arranging and putting out said real chrominance component pixels as scan lines and said interpolated chrominance component pixels as scan lines of a line doubled chrominance component, and
transcoder means connected to receive the line doubled luminance component and the line doubled chrominance component for decoding and putting out three color control signals to operate said line doubled display device.

23. The display system set forth in claim 22 further comprising color vertical transition enhancement means connected to said transcoder means for shortening the transition times of transitions of said three color control signals.

24. The display system set forth in claim 22 wherein said temporal median filter interpolator means comprises luminance temporal domain median filter means and chrominance temporal domain median filter means.

25. The display system set forth in claim 24 further comprising luminance median filter bypass soft switch means connected at the output of the luminance median selector for switching to a luminance spatial average value, further comprising chrominance median bypass soft switch means connected at the output of the chrominance median selector for switching to a chrominance spatial average value, and further comprising luminance motion detection means for detecting motion in the luminance component and for generating a luminance switching control signal, the switching control signal for effectively operating the luminance median bypass soft switch means, and for operating the chrominance median bypass soft switch means.

26. The display device set forth in claim 25 further comprising chrominance level detection means for detecting chrominance level and for putting out a chrominance override switching control signal above a predetermined threshold level, the chrominance median bypass soft switch means being controlled by the luminance control signal below the threshold level and by the chrominance override switching control signal above the threshold level.

27. The display device set forth in claim 26 wherein the onset of the luminance switching control signal lies in a range of 3-7 IRE units of motion amplitude.

28. The display device set forth in claim 27 wherein the luminance switching control signal is substantially linear with motion amplitude and reaches maximum value in a range lying between 5 and 15 IRE units.

29. The display device set forth in claim 26 wherein the threshold level is preestablished in a range of 30 to 50 IRE units.

30. The display device set forth in claim 22 wherein the spatial comb filter means includes two series connected line period delay elements.

* * * * *